Aug. 31, 1937.    R. L. TEMPLIN ET AL    2,091,535
DEFORMATION RECORDING APPARATUS
Filed Feb. 16, 1934    2 Sheets-Sheet 1

INVENTOR
Richard L. Templin
Donald I. Bohn
BY
his ATTORNEY

Aug. 31, 1937.  R. L. TEMPLIN ET AL  2,091,535
DEFORMATION RECORDING APPARATUS
Filed Feb. 16, 1934   2 Sheets-Sheet 2
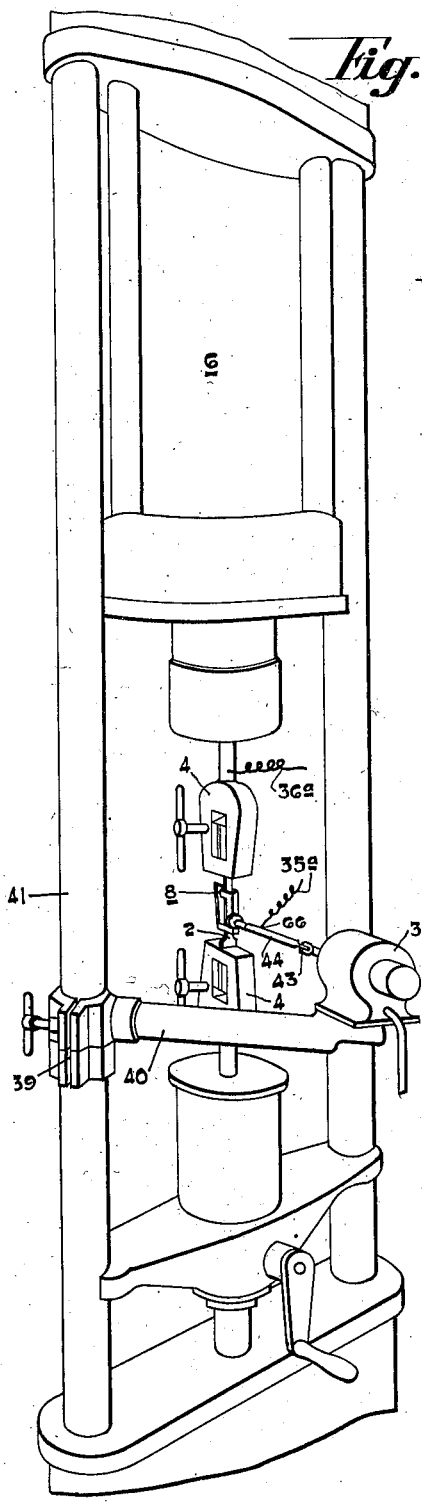
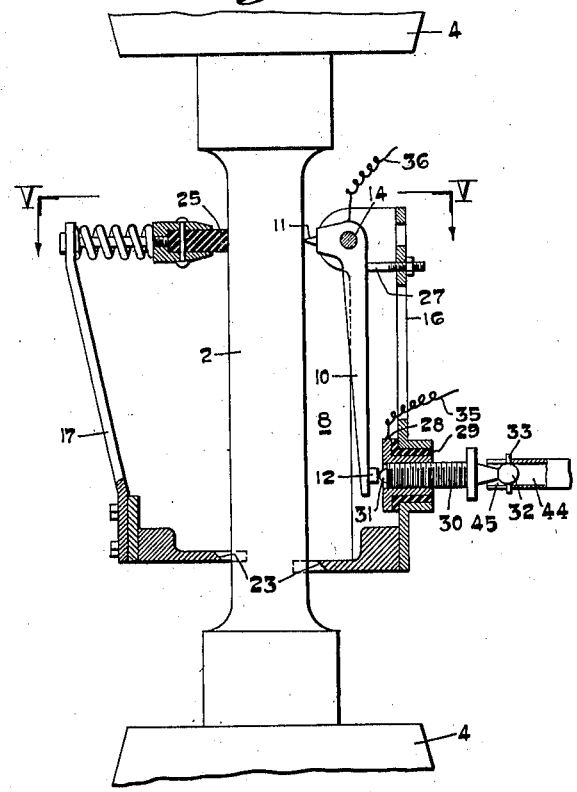
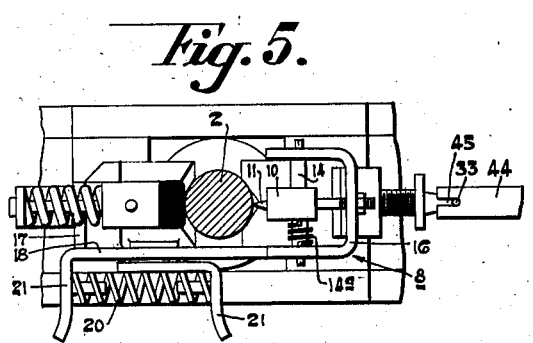
INVENTOR
Richard L. Temple
Donald I. Bohn
BY
his ATTORNEY Patented Aug. 31, 1937

2,091,535

UNITED STATES PATENT OFFICE 2,091,535

DEFORMATION RECORDING APPARATUS

Richard L. Templin, New Kensington, and Donald I. Bohn, Pittsburgh, Pa.

Application February 16, 1934, Serial No. 711,617

8 Claims. (Cl. 265—2)

This invention relates to apparatus for making and recording physical tests. It relates especially to apparatus for measuring the deformation of specimens of structural materials, both metallic and non-metallic, such as rods, sheets, wires, and the like, and for making stress-strain records of tests of such materials.

Some of the more modern methods of determining the stress-strain or load-deformation relationship of metals or other structural materials can be employed to much better advantage with deformation-measuring apparatus which is faster and more accurate than the apparatus which has generally been available at reasonable cost for this purpose in the past. This is particularly true in the testing of materials which do not have "yield points", in the meaning of that term as applied to hot rolled mild steel.

It is generally conceded that the ideal instrument for this purpose should have a magnification ratio of at least 250, and preferably of 500 to 1000 or more, and in accuracy and sensitivity it should be at least equal to the better extensometers now available. It should be able to repeat within close limits, and to record deformation with decrease as well as with increase in load. The instrument should be capable of rapid attachment to and detachment from test specimens which range in size from small wires and thin sheets to the larger structural test specimens now frequently used, and in the case of the smaller specimens, at least, the part of the instrument which is attached to and supported by the specimen should be as light as possible. Since the apparatus is to be used in routine commercial tests it must be rugged and easy to manipulate, and so designed as to permit its proper functioning in rapidly performed tests. The personal equation of the operation should be reduced to minimum. The apparatus should be adapted to use with existing testing machines, and its cost should be reasonable.

An object of our present invention is to provide an improved recording instrument and system having the desirable characteristics enumerated hereinabove as applied to recording both increases and decreases of strain.

Another object of our invention is to provide an improved recording apparatus and system which is simple in construction and operation and is adapted for high strain magnification with accuracy, sensitivity and convenience when used under various testing conditions. These results are specifically accomplished by an improved combination including a continuously operating source of power adapted to drive the recording apparatus and also including a selsyn transmitter and receiver, commonly referred to as selsyn motors, interconnecting the recorder apparatus and a control unit mounted on the specimen.

Our invention has for further objects such other operative advantages and results as are found to obtain in the apparatus within the scope of the claims appended hereto, it being understood that certain of the broad subject matter of this application constitutes the sole invention of R. L. Templin, one of the joint inventors hereof, as set forth in said Templin's sole application Serial No. 627,454, filed August 4, 1932.

Most commercial testing machines are, or can easily be provided with a recording drum, or with a dial or other equivalent, and a pencil or stylus which, while in contact with the drum, is moved parallel to the axis of the drum through a distance proportional to the load applied to the specimen, or in other words, proportional to the stress thereon. If, then, some means is provided for rotating the drum through an arc which is proportional to the deformation or strain of a specified length of the test specimen, the basis for a recording system is at hand. This fact has been recognized in the past, but in developing an operative instrument from this basis difficulties have always been encountered. As a result, instruments previously developed have had a magnification ratio which is too low, or have been too slow, or too inaccurate, or too heavy, or too expensive to be generally satisfactory for the wide variety of conditions encountered.

One of the principal difficulties encountered in the past has been that the power required to rotate the recording drum and control its movement with sensitivity and accuracy is large in comparison with the forces available in any unit or element of the recording system which can be attached to the test specimen without interfering with the accuracy of the test. This attached element should be very light in weight, as previously indicated. It is therefore necessary to provide an auxiliary source of power for operating the drum, and this source must be controlled accurately and without time lag by the deformation occurring in the test specimen. As one feature of our present invention we have provided an improved apparatus for rotating a recording drum or the like proportionately to the strain of the test specimen, and this improvement overcomes many of the difficulties previously encountered in attempting to construct apparatus suitable for use in rapid and accurate tests. In our improved system magnification ratios up to 16,000 or more can be obtained without sacrificing accuracy, and the results obtained at high and low magnification ratios can be consistently duplicated.

Tensile tests are usually made with specimens having a gage length of 2 inches, 8 inches or some other preselected distance which is generally greater than the unit length and throughout which the deformation is to be determined. Deformation measured over this gage length gives the first multiplication factor or amplification of the unit deformation, and in the case of a gage length of 2 inches, this factor is 2. Experience has shown that a single mechanical lever with a multiplication ratio up to about 5:1 is generally more satisfactory and dependable than lever systems with higher ratios for use in strain-following and measuring devices. Accordingly we prefer to employ a bell-crank lever giving an amplification of 5 as the strain-following element in our system. This makes the total amplification thus far obtained 10:1, if a specimen of 2" gage length is employed. With specimens of greater gage length, the total amplification is of course greater.

At about this point in the amplifying system we have found it convenient to change from a nominal linear motion to rotation, which is the motion of the recording drum. We have found that this may be readily accomplished by means of a fine threaded lead screw passing through a threaded bushing in the control element or clip in which the strain-following bell-crank lever is mounted. This screw and the lever constitute parts of an electric circuit arranged to control the force which operates the recording drum.

If the lead screw has 50 threads to the inch, one revolution of the screw results in a linear motion of 0.02", and if used with the 10:1 amplification previously obtained, one revolution of the lead screw is equivalent to a unit deformation of 0.002". For a total magnification ratio of 500:1, the periphery of the recording drum or the chart attached thereto must rotate 1" for each revolution of the lead screw; for a total ratio of 1000:1 the drum must rotate 2" for each revolution of the screw, etc. A drum and chart having a circumference of 10" must then turn through $\frac{1}{10}$ of a revolution to give a total amplification of 500:1, or through $\frac{1}{5}$ of a revolution to give a total amplification of 1000:1 under these conditions. For drums with larger circumferences a smaller fraction of a complete revolution would be required to give the same amplification, or greater amplification would be obtained with the same amount of rotation.

The desired rotation of the recording drum is readily provided for by a suitable arrangement of gears and motive means. For example, a large driven gear may be mounted on the shaft of the recording drum, preferably with a friction-gripping or spring-loaded hub, so that the gear may be turned independently of the shaft and the drum. One or more smaller driving gears, having the desired ratio or ratios to the large driven gear, are mounted on another shaft in position to mesh with the driven gear, and the rotation of these smaller gears is accurately synchronized with the rotation of the lead screw. In the present invention this synchronization is preferably accomplished by the use of two self-synchronizing motors, such as those which are commonly referred to as "selsyns", which term will be employed hereinbelow. One selsyn serves as a generator or transmitter and is connected to the shaft on which the small driving gears are mounted, while the other selsyn serves as a motor or receiver and is connected to the lead screw in the control element by means of a suitable coupling member. When current is applied the selsyns are automatically synchronized and rotation of the small driving gears and the selsyn transmitter, which are operatively connected to a common shaft, is exactly reproduced by the selsyn receiver and by the lead screw if it is directly connected with the receiver.

The shaft to which the selsyn generator and the driving gears for the recording drum are attached is preferably driven by a small auxiliary motor so arranged that its operation is controlled by the circuit including the lead screw and the strain-following element. The operation and effect of the auxiliary motor and the control circuit will be described in more detail hereinbelow. One of the numerous advantages of this system is that the control element attached to the specimen has no mechanical connection with the recording instrument, and may therefore be very light in weight. It has been found, for example, that a control element or clip for use with test specimens of 2" gage length need weigh only about two ounces, and that an element of this weight still gives satisfactory results after several months of almost continuous use.

In order that the nature and advantages of our invention may be more readily understood, it will now be described with reference to the accompanying drawings in which:

Fig. 3 is an elevational view of a testing machine with a test specimen mounted therein and a control element attached to the specimen;

Fig. 4 is an enlarged vertical sectional view showing a preferred form of control element mounted on the test specimen; and Fig. 5 is a horizontal sectional view taken along the line V—V in Fig. 4.

Figure 1:
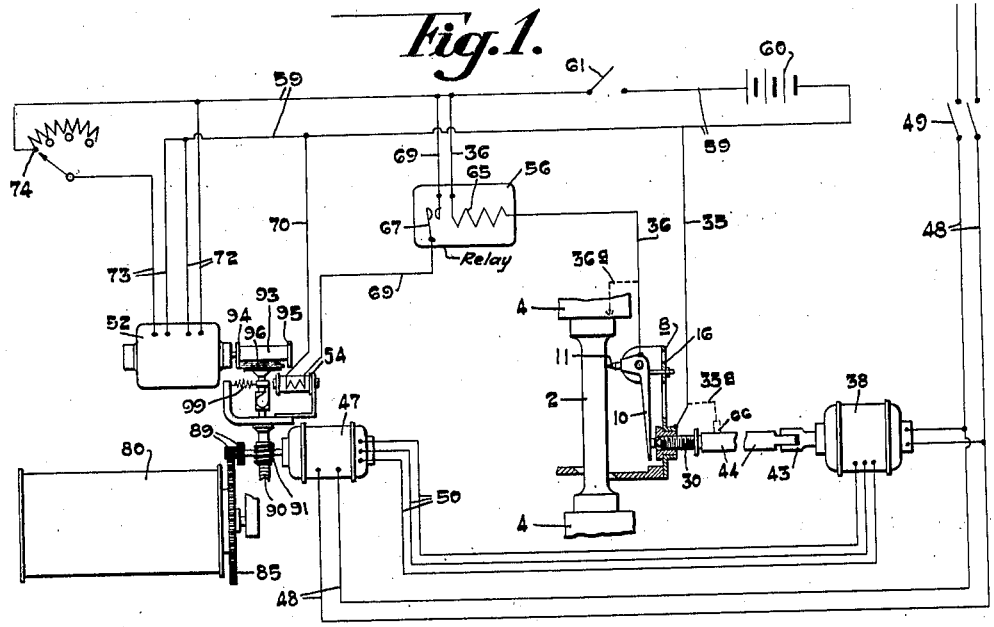
Fig. 1 is a somewhat diagrammatic view of the general arrangement of the apparatus and electrical connections.

In performing and recording a tensile test, for example, with our improved apparatus, a test specimen 2 which may be of round, rectangular or other suitable cross section, is gripped between the jaws of shackles 4, 4 of a testing machine 6, shown in Fig. 3. The testing machine may be of any type adapted to apply tensile stress to the specimen, and the shackles 4 may also be of any suitable type, although we prefer to employ shackles of the type described in the patent to R. L. Templin, No. 1,872,047. The test specimen may be of any desired gage length, but it will be assumed to be of 2" gage length, which is commonly used, especially in tests of the standard ½" diameter or ½" width specimens of metals, and in tests of smaller rods and specimens.

When the specimen is clamped firmly in the shackles of the testing machine, a control element or clip 8 bearing a strain-following element is attached thereto. If straight, carefully-prepared specimens are gripped in shackles of the preferred type with self-aligning grips, it is only necessary to measure the strain on one side or element of the specimen. This known fact is applied in the present system, in which only one strain-following element 10 is employed in the control element 8. This strain-following element preferably takes the form of a bell-crank lever with a multiplication factor of about 5, as previously stated, although levers with other multiplication factors may obviously be used. The lever 10 is provided at one end with a knife edge or point 11, as shown most clearly in Fig. 4, and this point contacts the test specimen 2 and moves in accordance with the strain thereof. At the other end the lever is provided with a contact button 12 adapted to contact with a lead screw. The lever is mounted on a pivot 14 between the side walls of one section of the control element 8, and is preferably in electric conducting relationship with the walls of the clip, although it may be insulated therefrom.

The clip or control element 8 consists of two sections 16 and 17 which are relatively movable, as shown most clearly in Fig. 5, as by moving a portion 18 of the side wall of section 16 longitudinally through a slot or channel 19 provided in the wall of the other section 17. The two sections are normally drawn together and held there resiliently by the expansion of a spring 20 mounted between handles or grips 21, 21, each of which is attached to one section of the control element, and the sections may be separated by pressing these grips together and thereby compressing the spring 20.

At or near the bottom of each section is a knife edge 23, which is preferably V-shaped or curved and tapers from both ends toward the center so that specimens of varying shape can be gripped securely and centered automatically in the clip. The section 17 is of resilient construction, and is provided at its upper end with a pad or buffer 25 of rubber, fiber, or the like which is in yielding contact with the specimen at a point opposite from its point of contact with the pointed end 11 of the bell-crank lever 10. When the grips 21, 21 are pressed together, the knife edges of the sections 16 and 17 are separated sufficiently to allow the control element to slide easily onto the specimen, and when the grips are released the element is held firmly in place on the specimen which is gripped between the knife edges 23, 23 at the lower end of the element, and between the pad 25 and the point 11 at its upper end. The control element may be readily and almost instantaneously removed at any time by simply pressing the grips 21, 21 together again.

Referring again to Fig. 4, a set screw or stop 27 is provided in the end wall of section 16 of the control element, and a small spring 14a or the like is preferably provided on the pivot 14 adapted to hold the lever 10 against the stop 27 when the lever is in its initial position. The stop is so adjusted that when the element 8 is attached to a specimen the point or edge 11 will be in proper alignment with the knife edge 23, and the distance between the point 11 and the edge 23 when the lever 10 is against the stop 27 is the predetermined gage length, such as 2 inches. It will now be clearly understood that as the specimen 2 is extended by the force or load applied during the test, the point 11 will move upward a distance equal to the total deformation of the 2 inch (or other) gage length; that the lever 10 will rotate about the pivot 14; that if the multiplication factor of the lever is 5, the movement of the button 12 will be ten times the unit deformation.

An internally threaded bushing 28 is also mounted in the end wall of section 16 of the control element, and is preferably electrically insulated therefrom by a tube and washer or other suitable arrangement of insulating material 29. Screwed into the bushing 28 is a finely threaded lead screw 30, provided at its inner end with a spherical or conical shaped contact tip 31 adapted to contact the button 12 on lever 10 to close an electric circuit. At its outer end the lead screw terminates in a ball 32 provided with small studs 33, or in other suitable means for forming a sliding coupled joint.

An insulated wire 35 is attached to the bushing 28 or directly to the lead screw 30, and another wire 36 is connected directly or indirectly to the lever 10. These two wires form a part of the electric circuit which controls the recording mechanism as will be described more fully hereinbelow, and they constitute the only connection between the control element 8 or the strain-following element 10 and the recording mechanism proper. In a preferred arrangement of this circuit, the wires 35 and 36 are not attached directly to the control element 8, but are connected to other parts of the system which are in electric conducting relationship with the lead screw 30 and the lever 10, respectively, as will be described hereinbelow.

As shown in Fig. 3, a selsyn motor or receiver 38 is adjustably mounted near the test specimen 2 and the control element 8, as by means of suitable clamps 39 and support 40 attached to a post or column 41 forming a part of the testing machine 6 or located conveniently adjacent thereto. The shaft of the motor 38 is connected through a suitable universal joint 43, which preferably is composed of or contains insulating material, to a light-weight coupling member 44, which may suitably be a tube provided at its outer end with slots 45 adapted to engage the studs 33 on the outer terminal 32 of the lead screw 30. When the support 40 is at the proper elevation, the motor 38 is readily swung around so that the coupling member 44 is in alignment with the lead screw 30 and joins easily therewith. The clamp 39 is then tightened to prevent movement of the motor, and any relative movement of the motor and the control element that may then occur during the test is taken up by the universal joint 43, which also facilitates the joining of the coupling members. Before starting the test the lead screw 30 is turned back in the bushing until it is well out of contact with the button 12 on the lever 10, and when it is screwed back through the bushing to follow the movement of the lever as the test proceeds, the linear motion of the screw merely causes the studs 33 to slide in the slots 45 in the end of the coupling member 44.

Referring particularly to Fig. 1, the selsyn motor 38 and the selsyn generator or transmitter 47 are electrically connected to an excitation circuit 48 controlled by a switch 49. The excitation circuit is preferably connected to a source of 110 volt, 60 cycle, single phase alternating current. The selsyns are connected to each other by synchronizing lead wires 50. An auxiliary motor 52, an electromagnet 54, and a relay 56, are connected to an auxiliary circuit 59 which may be energized by a battery 60 and controlled by a switch 61. If an alternating current motor and alternating current windings for the magnet and relay are used, the battery 60 may be omitted and the auxiliary circuit 59 can then be connected to the excitation circuit 48 or some other suitable supply of alternating current.

The primary or energizing circuit of the relay 56 comprises a wire or conductor 35 which connects the lead screw 30 with one side of the circuit 59, and a wire 36 which connects the bell-crank lever 10 with the other side of the circuit 59, and includes a high resistance coil 65 for the relay 56. This coil might obviously be connected with the wire 35 instead of with wire 36 with entirely similar results. Instead of the direct connections of wire 35 to the bushing 28 or the lead screw 30, and of wire 36 to the lever 10 or the wall of the control element 8, as shown in Fig. 4 and Fig. 1, these connections may be omitted and indirect connections may be substituted therefor. For example, the wire 36 may be connected by means of a wire 36a with one of the shackles 4 or some other part of the testing machine which is in electric conducting relationship with the specimen 2 and thence with the lever 10, and the wire 35 may be connected by means of a wire 35a and a brush 66 or other suitable contacting means with the coupling member 44, which in turn is in contact with the lead screw 30, as shown in Figs. 1 and 3. The lever 10 and screw 30 are insulated from each other by the insulation 29 around the bushing 28 or by suitable insulation of the pivot 14, and the coupling member 44 is insulated from the motor 38 and the rest of the system by an insulating universal joint 43, for example, or by insulation inserted elsewhere. With this modification there is no permanent connection between the control element 8 and the rest of the system, and no wires need be attached to the control element.

The primary relay circuit is closed when the lead screw 30 contacts lever 10, and if the switch 61 is closed at the time, the relay coil 65 is then energized. This coil is highly sensitive and very little current is required to energize it sufficiently to close the relay switch 67 in the secondary or working circuit. A small amount of current in this primary circuit is desirable, as it minimizes pitting and corrosion of the contact members on the screw 30 and the lever 10.

The secondary relay circuit comprises wires 69 and 70 connected, respectively, to opposite sides of the circuit 59, an electromagnet 54, and the relay switch 67. The magnet 54 is therefore energized by the battery 60 when the switch 67 is closed.

The auxiliary motor 52 is provided with a branch circuit 72 connected to the field and a branch circuit 73 connected to the armature. Each branch circuit is connected to the opposite sides of the circuit 59 and the armature circuit 73 may include a rheostat 74 for controlling the speed of the motor. This rheostat may be omitted, however, as entirely satisfactory results are obtained when the motor 52 is operated at full or constant speed.

Figure 2:
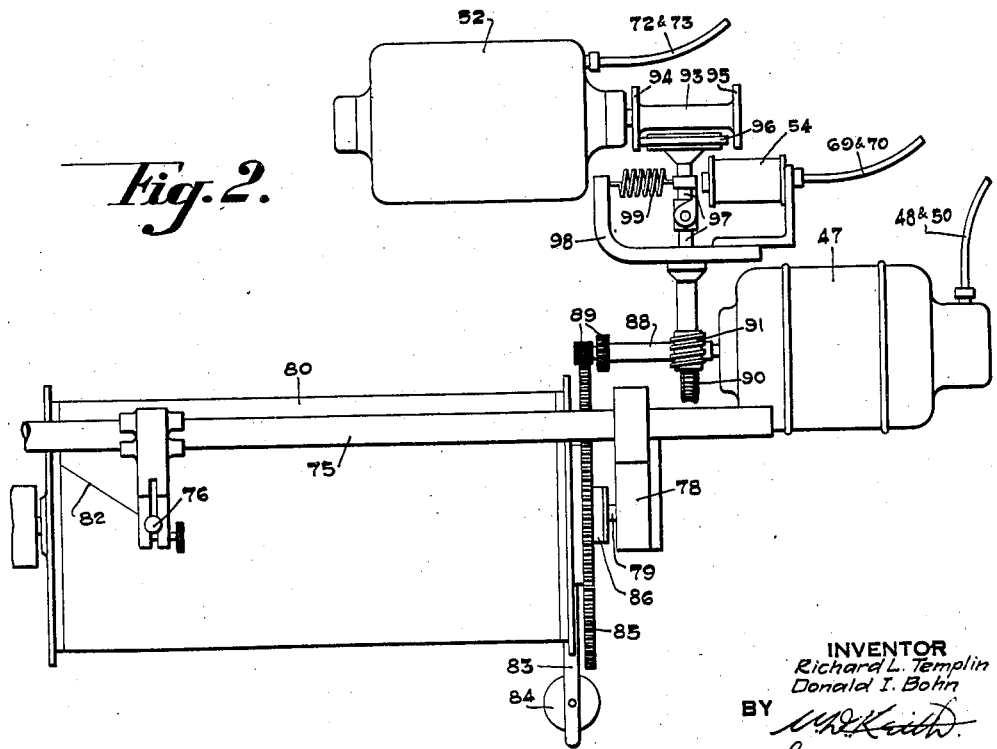
Fig. 2 is an enlarged plan view of the recording unit and auxiliary apparatus.

The recording instrument assembly, shown in more detail in Fig. 2, has no mechanical connection with the testing machine proper or the control element 8, and may be set up at any desired distance therefrom. As a matter of convenience, however, this assembly is generally located near the loading element or other device by means of which a load is applied to the testing machine and the test specimen mounted therein. When so located, a rod or tube 75 bearing a pencil or stylus 76 and slidably mounted in a suitable bearing in a frame member 78, may readily be so connected with the loading device, in known manner, that the longitudinal movement of the rod 75 is directly proportional to the load applied to the test specimen.

Near the rod 75 and journalled at one end in the frame member 78 or a member adjacent thereto is a shaft 79 on which a recording drum 80 is keyed or otherwise attached. A paper chart or recording sheet may be suitably attached around the periphery of the drum, which is so located that the stylus 76 may be lowered into contact with the drum or the chart thereon. When the rod 75 and the stylus 76 are then moved longitudinally in proportion to the load applied during a test, and the drum 80 is rotated through an arc proportional to the resulting deformation of the specimen, a curve 82 is drawn, which constitutes a load-deformation or stress-strain record of the test.

A brake 83, such as a rod or plate bearing against a flange at one end of the drum, may be applied and set by a thumb nut 84 or other suitable means to prevent rotation of the shaft 79 and drum 80. A gear 85 is mounted on the shaft 79 at one end of the drum 80 by means of a spring-loaded hub 86 or other suitable device whereby rotation of the gear causes the shaft and drum to rotate when the brake 83 is released, but the gear is allowed to rotate on the shaft without turning the drum when the brake is applied.

Mounted near the recording drum 80 is the selsyn generator or transmitter 47 provided with an elongated shaft 88. Keyed to this shaft are one or more small gears 89 adapted to engage the gear 85, and a gear 90 in operative engagement with a worm gear 91, these gears broadly comprising power transmitting means for relatively moving the recorder elements in either of opposite directions. The auxiliary or driving motor 52 is also located near at hand, preferably with its shaft 93 parallel with the shaft 88, and provided with two driving discs 94 and 95. Between these discs is a driven disc or reversing disc 96 adapted to contact with either of the driving discs and mounted on one end of a partially flexible shaft 97. The discs 94, 95 and 96 broadly comprise controllable means for connecting the continuously operating power means 52 to the power transmitting means 85, 89, 90 and 91 so as to effect opposite movement of the recorder elements. The worm gear 91 is firmly attached to the other end of the shaft 97 and rotates therewith.

The shaft is supported in a suitable bearing in or attached to a frame member 98 which also supports the magnet 54 and is attached to one end of a spring 99. The other end of the spring 99 is attached to a collar or the like on the shaft 97, and the spring normally holds the reversing disc 96 against the driving disc 94. When the magnet 54 is energized, however, the reversing disc is pulled over against the tension of the spring 99 into contact with the driving disc 95, and the direction of rotation of the shaft 97 and the worm gear 91 is thereby reversed. This, of course, reverses the rotation of shaft 88, and the gear 85 and the selsyn generator 47 driven therefrom.

The procedure of making a record and test with our improved system will now be readily understood. A test specimen 2 is inserted between the shackles 4 of a testing machine 6 and gripped firmly thereby. The control element 8 is then attached to the specimen with the point 11 of the lever 10 substantially perpendicular to the surface of the specimen and the lead screw 30 withdrawn into the bushing 28. The selsyn motor 38 is swung into position and coupled with the lead screw by means of the coupling member 44. The switch 49 in the excitation circuit 48 is closed, thereby synchronizing the selsyn motor 38 with the selsyn generator 47. The brake 83 is applied to the recording drum 80, on which a blank chart has been placed.

The switch 61 in circuit 59 is then closed, starting the auxiliary motor 52 which now constitutes a continuously operating power means. The spring 99 holds the reversing disc 96 against the driving disc 94, and the worm gear 91, the shaft 88, the gear 85, and the selsyn generator 47 are driven in a positive direction, while the drum 80 remains stationary. The selsyn motor 38 revolves exactly the same amount as the selsyn generator 47, with which it is synchronized, and in so doing turns the lead screw 30 into and through the bushing 28.

This positive rotation continues until the contact tip 31 on the lead screw 30 touches the contact button 12 on the lever 10, these contacts being closed or opened in response to increases or decreases in strain of the specimen. When this happens the primary circuit through the sensitive relay 56 is closed and the relay coil 65 is energized, closing the switch 67 in the secondary circuit. The magnet 54 is then energized and pulls the reversing disc into contact with the driving disc 95, reversing the rotation of the worm gear 91 and the other apparatus driven and controlled thereby. This reverse rotation causes the lead screw 30 to back away from the lever 10, thereby opening the primary relay circuit and deenergizing the coil 65. This permits the switch 67 to open, deenergizing the secondary circuit and the magnet 54. The spring 99 then returns the disc 96 to its normal position in contact with the disc 94, and positive rotation is resumed. Thus the spring 99 and magnet 54 broadly comprise means controlled by the primary and secondary circuit for broadly operating the disc 96.

As soon as the contact 31 on the lead screw first comes into contact with the button 12, the preliminary steps are completed and the test proper can be started. These preliminary steps actually require but a few seconds for completion—usually not more than a minute. The stylus 76 is then lowered into contact with the recording drum or chart, if this has not been done previously, and the brake 83 is released, permitting the drum 80 to revolve with the gear 85. The load is then applied gradually to the specimen in known manner, and the test and record are under way. The stylus 76 moves longitudinally across the chart a distance proportional to the load applied, and as the specimen is deformed deformation is followed by the point 11 on the lever 10, which rotates about its pivot 14, swinging the button 12 away from the lead screw 30. The positive rotation of the lead screw will then continue until contact with the lever is again established at a point which is continually moving away from the screw, and the positive rotation thus continues through an arc greater than the arc through which reverse rotation is carried in breaking the contact. As a result the recording drum is rotated by small increments with respect to the stylus, and the curve 82 is drawn upon the chart. The reversals are so rapid that the curve is usually substantially smooth, although with some magnification ratios and rates of loading the curve may be slightly serrated.

The test and record may be continued to any desired point—that is, until the load applied exceeds the ultimate strength of the specimen and causes its rupture, or until a lesser load has been applied. It may, for example, be desirable to obtain a stress-strain record up to a point where the yield point of the specimen has been materially exceeded, and also to record the ultimate strength of the specimen. This is done by starting a test and record in the usual way and continuing it until the yield point has been sufficiently passed, then opening the switches 61 and 49, uncoupling the selsyn motor 38 from the lead screw 30, and detaching the clip or control 8 from the specimen. This is readily and quickly done without interrupting the test, and while the strain record is of course discontinued when the motors are shut off and the drum ceases to revolve, the increase in stress until the specimen is ruptured is recorded as a longitudinal line on the chart. Such records are very instructive.

Our improved system is also well adapted to the making and recording of tests in which the specimen is repeatedly loaded and unloaded to any desired extent, and while the system was designed primarily for tensile tests it performs in a similar and entirely satisfactory manner in compressive tests.

Almost any desired magnification of the unit deformation can be obtained by proper selection of gage length of the specimen, multiplication factor of the strain-following lever 10, pitch of the threads on the lead screw 30, diameter of the recording drum, and ratio of the gear 85 mounted on the shaft of the recording drum to the gear or gears 89 by which it is driven. A worm and gear may also be inserted between the selsyn motor 38 and the lead screw, and with this arrangement we have employed magnification ratios as high as 16,000:1 with satisfactory results. At these very high magnifications the testing speed (or rate of loading) should be low to obtain the best results, but with more normal magnifications, between 400:1 and 1000:1, for example, satisfactory results are obtained with testing speeds up to 0.3 inch per inch per minute, which includes the ranges of good commercial practice.

It will be evident to those skilled in the art that various modifications can be made in the several parts of our apparatus, in addition to those described by way of example hereinabove, without departing from the spirit of our invention, and it is our intention that the claims shall cover such modifications as are included within the scope thereof. Certain parts and features of the improvements described hereinabove are the sole invention of R. L. Templin and are claimed in his application Serial No. 627,454, filed August 4, 1932.

We claim as our invention:

1. Apparatus for recording deformations of a test specimen comprising, in combination, a recording element; a continuously operable electric motor; controllable means operatively connecting said motor with said recording element and effective for reversely moving the same; a control device of lightweight attached to and defining the gauge length of the specimen; said device containing a strain following member in contact with the specimen and movable in proportion to the deformation thereof; and means cooperating with said strain following member, including an electric circuit of which said strain following member constitutes a part, for controlling said operative connection between said motor and recorder element thereby to move the latter in opposite directions in accordance with increases and decreases in deformation of the specimen.

2. Apparatus for recording the deformation of test specimens comprising, in combination, a recording element, a continuously operable electric motor, controllable means operatively connecting said motor to said recording element for reversely moving the latter, a lightweight control device detachably connected to the test specimen and having as a self-contained part thereof a pivotally mounted strain following member cooperating with said control device to define the gauge length of the specimen and movable proportionately to the deformation thereof, and means for controlling said operative connection between said motor and recording element whereby the latter is reversely moved respectively proportionally to increases and decreases in the deformation of the specimen including an electric circuit distinct from said motor and containing said strain following member as a part.

3. Apparatus for recording the deformation of test specimens, comprising a recorder element, a shaft operatively connected with said recorder element, electric actuating means adapted to rotate said shaft and the recorder element, a light weight control element containing a pivotally mounted member in contact with the specimen and movable proportionately to the deformation thereof and a threaded member rotatable into contact with the movable member, an electric circuit including said pivotally mounted member and threaded member whereby contact or disengagement of said pivotal member with said threaded member opens or closes the circuit, means controlled by said circuit for rotating said shaft in one direction when said circuit is opened and for reversing the rotation of said shaft when the circuit is completed, and means for synchronizing the rotation of said threaded member with the rotation of said shaft, whereby the rotation of the recorder element is made proportional to the deformation of the specimen.

4. Apparatus for recording the deformation of test specimens, comprising a recorder element, a pair of electrically-connected self-synchronizing motors, an auxiliary motor adapted to simultaneously rotate the recorder element and one of the self-synchronizing motors, a strain-following element having a contact movable proportionately to the deformation of the specimen, a threaded member detachably connected to the second of the self-synchronizing motors and rotatable therewith, a movable contact adapted for cooperation with said other contact, and an electric circuit including said contacts for controlling the operation of the recorder element, said threaded member being adapted upon rotation to move said cooperating contact into engagement with said other contact of the strain-following element to close said electric circuit and thereby control the operation of said recorder element.

5. Apparatus for recording the deformation of test specimens, comprising a shaft with a recorder element and a gear mounted thereon, a pair of electrically-connected self-synchronizing motors, a second shaft operatively connected to one of the self-synchronizing motors and bearing a gear adapted to engage the first mentioned gear, an auxiliary motor adapted to rotate said second shaft and the recorder element and self-synchronizing motor connected thereto, an electric circuit for controlling the operation of the recording element, a control element attachable to the test specimen and containing a strain-following member in contact with and movable proportionately to the deformation of the specimen and containing a threaded member rotatable into contact with said strain-following member to close said electric circuit which controls the rotation of said second shaft by said auxiliary motor, and a coupling member adapted to detachably connect said threaded member with the second self-synchronizing motor, whereby rotation of said threaded member is synchronized with the rotation of said second shaft, and the rotation of the recorder element driven by said shaft is made proportionate to the deformation of the test specimen.

6. In apparatus for recording the deformation of test specimens, a recorder element, continuously operable electric actuating means adapted to rotate said recorder element in opposite directions, a pivotally mounted strain-following element capable of attachment to a specimen substantially without effecting the accuracy of a test thereof and movable proportionately to the deformation of the specimen, means cooperating with said strain-following element and movable proportionately to the movement thereof, an electric circuit including said strain following element and cooperating means for opening and closing the circuit, means for moving said cooperating means in synchronism with the movement of said recorder element, and means controlled by said circuit whereby rotation of the recorder element is in one direction when the circuit is open and is reversed when the circuit is closed.

7. In apparatus for recording the deformation of test specimens, a recorder element, a motor with a pair of driving discs mounted on its shaft, said motor being operated continuously in one direction during a test, a driven disc located between the driving discs and substantially perpendicular thereto, a shaft operatively connected to cause rotation of the recorder element and having said driven disc mounted thereon, resilient means whereby the driven disc is normally maintained in contact with one of the driving discs, an element, means whereby said latter element is movable proportionately to the deformation of the test specimen, a circuit controlled by said latter element, and an electromagnet energized by said circuit and adapted when so energized to move the driven disc into contact with the second of the said driving discs, whereby the direction of rotation of the recorder element is reversed.

8. Recording apparatus for a test specimen stressed in a materials testing machine comprising, in combination, relatively movable chart and marker elements, continuously operating power means, power transmitting means for relatively moving said elements in either of opposite directions, means for connecting said transmitting means to said power means to effect said opposite movements, an electrical circuit including contacts which are closed or opened in response to increases or decreases in strain of a specimen, and means controlled by said circuit for operating said connecting means.

RICHARD L. TEMPLIN.
DONALD I. BOHN.